United States Patent [19]
Karol

[11] 3,757,640
[45] Sept. 11, 1973

[54] SIMPLIFIED FOLLOWER SERVOMECHANISM

[75] Inventor: Joseph A. Karol, Orange, Conn.
[73] Assignee: Avco Corporation, Stratford, Conn.
[22] Filed: Dec. 1, 1971
[21] Appl. No.: 203,550

[52] U.S. Cl............................ 91/49, 91/376, 91/416, 91/417
[51] Int. Cl. .... F15b 13/04, F15b 9/10, F15b 15/17
[58] Field of Search....................... 91/49, 376, 416, 91/417

[56] References Cited
UNITED STATES PATENTS

| 808,549 | 12/1905 | Koerner | 91/49 |
| 3,141,386 | 7/1964 | Loughridge | 91/417 R |
| 2,742,879 | 4/1956 | Kieser | 91/49 |
| 3,125,319 | 3/1964 | Arbogost et al. | 91/49 |
| 3,252,686 | 5/1966 | Chadwick | 91/49 |

Primary Examiner—Paul E. Maslousky
Attorney—Charles M. Hogan and Gary M. Gron

[57] ABSTRACT

A follower servomechanism comprises a piston displaceable in a chamber so that the chamber is divided into first and second compartments. A plunger integral with the piston extends out of the housing through the second compartment so that the effective area of the piston exposed to the first compartment is greater than the effective area exposed to the second compartment. A tube telescoped into a bore through the piston has a port which registers with a surface exposed to the first compartment to form a variable area orifice. A source of pressurized fluid is applied to the second compartment and a bleed passage in the piston connects the first and second compartments. A displacement of the tube relative to the piston causes a variation in the flow from the first compartment and its pressure, thus causing the piston to accurately follow the displacement of the force tube.

2 Claims, 1 Drawing Figure

PATENTED SEP 11 1973
3,757,640
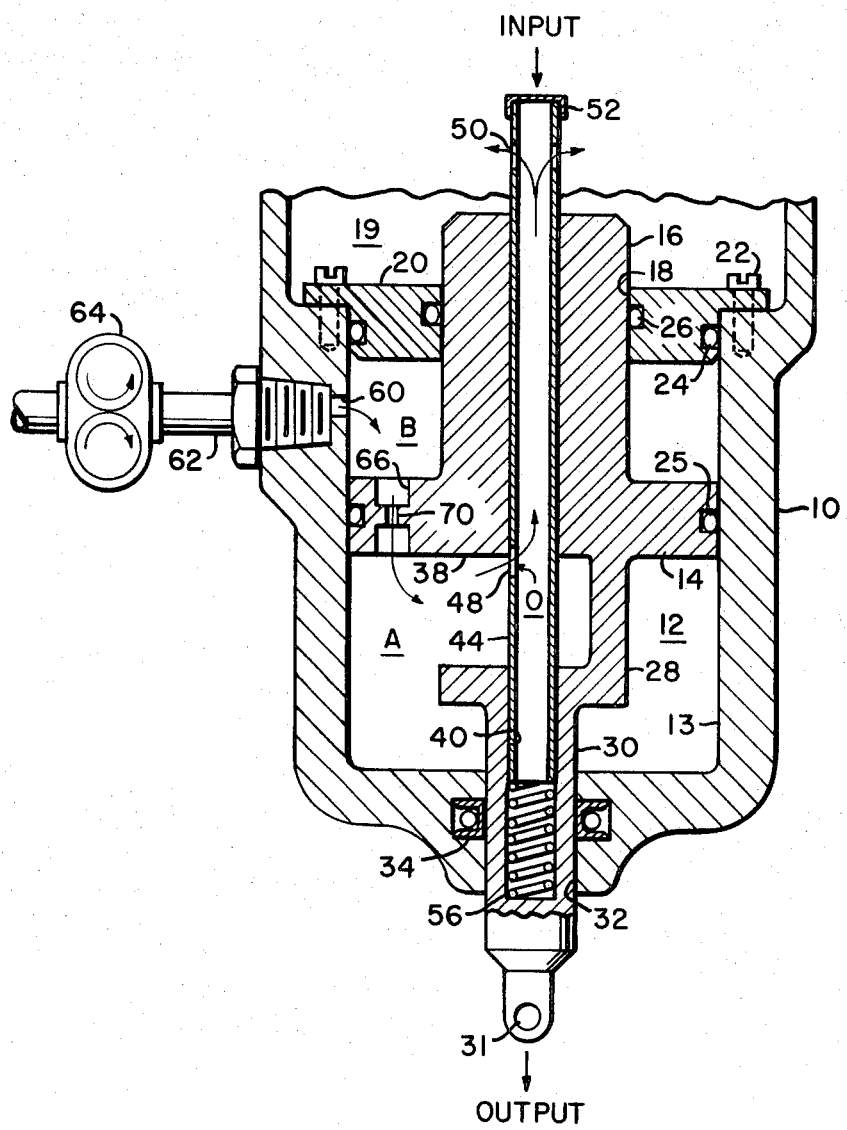
INVENTOR.
JOSEPH A. KAROL
BY Charles M. Hogan
Gary M. Gron
ATTORNEYS.

SIMPLIFIED FOLLOWER SERVOMECHANISM

The present invention relates to servomechanisms and more specifically to follower servomechanisms.

A follower servomechanism is a device which converts a low force displacement input directly into a high force displacement output which accurately follows the input. This type of device is frequently used in gas turbine engine controls where the precise control of a component is desired, such as controlling variable inlet guide vanes of an axial flow compressor. In the past this task has been accomplished by flapper valve or pilot valves controlling pressure levels on opposite faces of a power piston connected to the device to be controlled. The movement of an input lever varies flow through the flapper or pilot valve to produce a pressure differential across the power piston. The power piston then displaces and nulls out the pressure differential to re-establish a force balance across it. These types of devices have been used extensively in the past. They are, however, quite complicated and expensive. Moreover, their complexity necessitates a much larger unit than would be desirable for many small gas turbine engines.

Therefore it is an object of the present invention to provide a highly simplified, economical and effective follower servomechanism.

These ends are achieved by a follower servomechanism which incorporates a tubular element telescoping into a piston displaceable in a chamber. The tubular element has a port which cooperates with a surface on the piston to provide a variable flow of pressurized fluid from a compartment on one side of the piston to a low pressure point. The piston tends to seek a position relative to the tubular element to maintain a force balance across it. Any input displacement of the tubular element causes the piston to move an equal amount to re-establish the force balance.

The above and other related objects and features of the present invention will be apparent from a reading of the description of the disclosure shown in the accompanying drawing and the novelty thereof pointed out in the appended claims.

The single FIGURE illustrates a fragmentary view of a housing which incorporates a follower servomechanism embodying the present invention.

In the drawing there is shown a follower servomechanism comprising a housing 10 in which a cylindrical chamber 12 is formed by a bore 13 and end cap 20 secured to housing 10 by screws 22. An O-ring 24 seals the end cap 20 relative to chamber 12. The upper end of housing 10 opens into a drain chamber 19, only a portion of which is shown for simplicity's sake.

A piston 14 is longitudinally displaceable in chamber 12 and has a plunger 16 extending through an opening 18 in end cap 20. Sliding seal 26 seals plunger 16 relative to opening 18. A sliding seal 25 around the periphery of piston 14 seals first and second chambers A and B on opposite sides of piston 14. A generally L-shaped extension 28 is integral with the opposite face of piston 14. A piston output shaft 30 is integral with extension 28 and extends through a bore 32 in housing 10. Piston output shaft 30 has a hole 31 or appropriate means of connection to the component that is to be displaced. A sliding seal 34 provides a suitable seal for the piston output shaft. A port 66 through piston 14 connects compartments A and B. Port 66 has a relatively small central passage 70 to form a bleed passage from compartment B to compartment A.

The piston has a longitudinal bore 36 extending through plunger 16 from the outside and terminating in a surface 38 exposed to compartment A. An additional bore 40 in the L-shaped extension 28 opens into compartment A and extends into piston output shaft 30.

A tube 44 is telescoped through bore 36 and into bore 40. The tube 44 may be conveniently formed from tubular stock that has been outside ground using standard manufacturing techniques to achieve a very close tolerance between its periphery and bores 36 and 40, thus providing a lap-type seal. A spring 56 abuts the bottom of bore 40 and also abuts the end of tube 44 to stabilize its motion.

Tube 44 has a port 48 which registers with surface 38 to produce a variable area orifice 0. Preferably, port 48 is rectangular in shape to produce a maximum change in the area of the orifice 0 for a given displacement of tube 44 relative to surface 38. A plurality of ports may be provided to achieve an even greater area change for a given relative displacement. Furthermore, the shape may be selected to achieve the optimum area displacement change for proper operation. Ports 50 adjacent an end cap 52 on the end of tube 44 projecting from housing 10 provide a flow path for fluid from the interior of tube 44 to the low pressure drain chamber 19 of housing 10. Alternatively, chamber 19 may be open to atmosphere as long as a suitable arrangement is provided to collect the discharged fluid. The open opposite end of tube 44 connects the bottom wall of bore 40 with the low pressure drain chamber 19 to prevent any build-up of high pressure fluid that would unduly bias the tube 44.

An inlet port 60 connects compartment B with a fluid pressure supply conduit 62 leading from a suitable source of pressurized fluid, for example, supplied by a pump 64.

In operation, pressurized fluid from pump 64 enters compartment B, thus acting to urge piston 14 downward over an effective area determined by the area of piston 14 less the area of plunger 16. The bleed flow passage 70 permits a flow of fluid from compartment B to compartment A, thus permitting fluid pressure to act against the opposite side of piston 14 over an area determined by the area of piston 14 less the area of the piston output shaft 30. It should be noted that the effective area over which the pressurized fluid acts in compartment B is substantially less than the effective area for compartment A. The fluid in compartment A passes through port 48 to the low pressure discharge to maintain a pressure in compartment A proportional to the flow through the variable area orifice. For a given initial position of tube 44, piston 14 seeks a position relative to tube 44 that causes a force balance to exist across piston 14. In other words, the area of the variable orifice is established so that the pressure times area in compartment A equals the pressure times area in compartment B. For displacement of tubular element 44 in a downward direction the variable orifice is enlarged, thus permitting a greater flow out of compartment A to lower its pressure. When this happens a force differential exists across piston 14, thus causing the fluid in compartment B to urge piston 14 in a downward direction. As it is displaced, surface 38 begins to register with port 48, thus decreasing the variable area orifice. This reduces the flow out of compartment A thus increasing its pressure to a level which causes a force balance to be re-established across piston 14.

For displacement of tubular element 44 in an upward direction, port 48 is closed by surface 38 thus causing the pressure in compartment A to build up to the level in compartment B. Since the effective area in compartment A is greater than that for compartment B, a force differential occurs across piston 14 which displaces it in an upward direction. When surface 38 beings to uncover port 48 the area of the orifice increases to lower the pressure and re-establish a force balance across piston 14.

It can be seen that the above follower servomechanism is highly simplified and capable of being manufactured in a very compact package. The use of the tube permits this great reduction in size. In addition, the direct inner connection between the piston and the tube permits a highly accurate control of position since there is no mechanical linkage to provide slop in the system. The tube is a relatively inexpensive item and can be outside ground using inexpensive manufacturing techniques to produce a highly accurate interfit between its outer periphery and the bores in the piston. The port 48 may be conveniently manufactured by either electrochemical milling or preferably by electrical discharge machining, both of which can produce highly accurate rectangular and other shaped ports.

While the preferred embodiment of the present invention has been described, it should be apparent to those skilled in the art that it may be modified without departing from the spirit and scope thereof.

Having thus described the invention what is claimed as novel and desired to be secured by Letters Patent of the United States is:

1. A follower servomechanism comprising:
a housing having a chamber therein;
a piston longitudinally displaceable in said housing to divide said housing into first and second variable compartments formed in part by opposite faces of said piston, said piston having an integral number extending through said second compartment and through an opening in said housing to the exterior thereof, the cross-sectional area of said plunger being such that the effective area of the piston face exposed to said first compartment is greater than the effective area of the piston exposed to said second compartment, said piston and plunger having a longitudinal bore therien having an open end at a surface exposed to said first chamber, said piston comprising a generally L-shaped extension integral with said piston and having an output shaft extending from said L-shaped extension through said first compartment to the exterior of said housing, said L-shaped extension and said output shaft having a closed end bore coaxial with said longitudinal bore;
said piston having a bleed orifice for providing a bleed passage for fluid between said first and second compartments;
a tubular element having a smooth cylindrical outer surface, said tubular element telescoping through said longitudinal piston bore to a close fit therewith from a first end exterior of said housing, said tubular element having a second end which is open and extends into said closed end bore to prevent buildup of pressure therein, said tubular element having a returning port in the side wall thereof registering with the open end of said piston bore to form a variable area orifice, and an opening adjacent said first end to permit discharge of fluid from the interior of said tubular element;
a spring positioned in said output shaft and acting on the opposite side of said tubular element to stabilize its motion;
said closed end bore providing means for preventing flow of fluid from a second end of said tubular element so that said variable area orifice controls the flow of fluid from said first compartment through the interior of said tubular element to its first end thereby varying the pressure on opposite faces of said piston to displace it relative to said tubular element to meter the flow through said variable area orifice;
whereby displacement of said tubular element from an initial position in which a force balance exists across said piston to another final position, produces a pressure differential across said piston causing an equal displacement to re-establish a force balance across said piston.

2. A follower servomechanism as in claim 1 wherein said metering port is rectangular in shape thereby producing a relatively large change in the area of said variable orifice for a given displacement of said tubular element realtive to said piston.

* * * * *

UNITED STATES PATENT OFFICE
CERTIFICATE OF CORRECTION

Patent No. 3,757,640        Dated September 11, 1973

Inventor(s) JOSEPH A. KAROL

It is certified that error appears in the above-identified patent and that said Letters Patent are hereby corrected as shown below:

Col. 3, line 7, "beings" should read -- begins -- .

Col. 3, line 38 (Claim 1, line 6), "number" should read -- plunger -- .

Col. 3, line 46 (Claim 1, line 14), "therien" should read -- therein -- .

Col. 4, line 18 (Claim 1, line 32), "returning" should read -- metering -- .

Signed and sealed this 25th day of December 1973.

(SEAL)
Attest:

EDWARD M. FLETCHER, JR.
Attesting Officer

RENE D. TEGTMEYER
Acting Commissioner of Patents